(12) United States Patent
Gantillon

(10) Patent No.: US 10,752,783 B2
(45) Date of Patent: Aug. 25, 2020

(54) NON-STICK COATING PRIMER COMPOSITIONS AND PROCESSES FOR THE PREPARATION THEREOF

(71) Applicant: SEB S.A., Ecully (FR)

(72) Inventor: Barbara Gantillon, Leschaux (FR)

(73) Assignee: SEB S.A., Ecully (FR)

( * ) Notice: Subject to any disclaimer, the term of this patent is extended or adjusted under 35 U.S.C. 154(b) by 60 days.

(21) Appl. No.: 15/567,417

(22) PCT Filed: Jun. 23, 2016

(86) PCT No.: PCT/FR2016/051552
§ 371 (c)(1),
(2) Date: Oct. 18, 2017

(87) PCT Pub. No.: WO2016/207563
PCT Pub. Date: Dec. 29, 2016

(65) Prior Publication Data
US 2018/0086919 A1   Mar. 29, 2018

(30) Foreign Application Priority Data

Jun. 24, 2015 (FR) ..................... 15 55826

(51) Int. Cl.
*C09D 5/00* (2006.01)
*B05D 5/08* (2006.01)
(Continued)

(52) U.S. Cl.
CPC ............. *C09D 5/002* (2013.01); *B05D 5/086* (2013.01); *C08G 73/10* (2013.01); *C09D 179/08* (2013.01); *C08G 73/14* (2013.01); *C08K 3/36* (2013.01); *C08K 5/544* (2013.01); *C08K 2201/005* (2013.01)

(58) Field of Classification Search
CPC ...... C09D 5/002; C09D 179/08; B05D 5/086; C08G 73/10; C08G 73/14; C08K 2201/005; C08K 3/36; C08K 5/544
See application file for complete search history.

(56) References Cited

U.S. PATENT DOCUMENTS 4,961,996 A   10/1990   Carre et al.
5,037,701 A *  8/1991   Carre .................. C03C 17/3405
                                                           428/420

(Continued)

FOREIGN PATENT DOCUMENTS

EP   0386379 A1   9/1990
FR   2625450 A1   1/1988
(Continued)

OTHER PUBLICATIONS

Liu, Peng, "Preparation and Characterizations of Poly(amic acid) Grafted Silica Nanoparticles", Iranian Polymer Journal, 2005, pp. 968-972, vol. 14(11).

*Primary Examiner* — Hai Y Zhang
(74) *Attorney, Agent, or Firm* — The Webb Law Firm

(57) ABSTRACT

Provided are non-stick coating hybrid primer compositions based on polyimide resin and/or polyamide-imide resin. Also provided are processes for preparing such compositions. Finally, non-stick coatings incorporating such compositions and a process for manufacturing articles comprising such non-stick coatings are provided.

6 Claims, 1 Drawing Sheet

(51) Int. Cl.
*C08G 73/10* (2006.01)
*C09D 179/08* (2006.01)
C08G 73/14 (2006.01)
C08K 3/36 (2006.01)
C08K 5/544 (2006.01)

(56) References Cited

U.S. PATENT DOCUMENTS

| | | |
|---|---|---|
| 2005/0245715 A1 | 11/2005 | Wu et al. |
| 2007/0154431 A1* | 7/2007 | Nagai .................. A61K 8/8111 424/70.12 |
| 2010/0181322 A1 | 7/2010 | Perillon et al. |

FOREIGN PATENT DOCUMENTS

| | | |
|---|---|---|
| FR | 2915205 A1 | 4/2007 |
| KR | 1020090111951 | 10/2009 |

\* cited by examiner

NON-STICK COATING PRIMER COMPOSITIONS AND PROCESSES FOR THE PREPARATION THEREOF

CROSS-REFERENCE TO RELATED APPLICATIONS

This application is the United States national phase of International Application No. PCT/FR2016/051552 filed Jun. 23, 2016, and claims priority to French Patent Application No. 1555826 filed Jun. 24, 2015, the disclosures of which are hereby incorporated in their entirety by reference.

FIELD OF THE INVENTION

The present invention relates generally to non-stick coating primer compositions based on polyimide resin and/or polyamide-imide resin. The present invention also relates to the methods for the preparation of such compositions. Finally, the present invention pertains to non-stick coatings incorporating such compositions and a method for manufacturing items comprising such non-stick coatings.

DESCRIPTION OF RELATED ART

Non-stick coatings based on fluorocarbon resin, and in particular polytetrafluoroethylene (PTFE), are commonly used in the field of culinary items. They are made from at least one primer layer containing a fluorocarbon resin and one binder resin. This primer layer is then coated with one or more layers based on a fluorocarbon resin, particularly PTFE, in which the amount of fluorocarbon resin is gradually increased.

Binder resins, which allow this primer layer to adhere to other fluorine-containing layers on the substrate, are typically made of a polyamide-imide (PAI), polyimide (PI), polyphenylene sulfide (PPS), polyethersulfone (PES), or polyether ether ketone (PEEK).

In the specific case where the primer layers are to be light in color, PES, PPS or PEEK resins are preferable.

However, the use of these resins is not straightforward, as they are poorly soluble except in polar aprotic solvents, which for the most part are subject to labeling as harmful or even toxic products per REACH regulations. These resins are suitable in practice for use in powder form. However, obtaining powders of sufficiently small particle size is difficult and costly, and consequently it is difficult to grind these polymers to an average size of less than 10 μm. Consequently, the distribution of these resins in the primer layer is thus non-homogenous and leads to loss of adhesion upon use.

To this effect, binder resins that are supplied in solution or as a powder that can be diluted in water are easier to implement. However, these contain large quantities of solvent.

When delivered in the form of a powder that can be diluted in water, the solvent constraint is no longer an issue, but these binder resins demonstrate insufficient thermal stability, even if this does not impact most of the properties of the obtained coating. In fact, during the step of sintering the fluorocarbon resin, and in particular PTFE (performed at a temperature greater than 370° C. and preferably at 415° C.), a small amount of the binder resin, particularly the PAI resin, decomposes. In addition, the use of a labile amine in the implementation of the aqueous phase of the binder resin, and particularly the PAI resin, leads to generate a significant proportion of volatile organic compounds and causes an unacceptable yellowing of the obtained coating.

On the other hand, a silica grafted with polyamic acids is known (Peng Liu, Iranian polymer Journal 14, (11) 2005, 968-972). These grafted silicas demonstrate improved thermal stability; however, on one hand, the starting compound is an existing silica, and on the other hand all modifications are performed in a solvent media and they are recommended for use in solvent media.

Patent documents EP0386379 and FR2625450 both describe in a similar manner mixtures of PAI resin and an aminosilane. In the method described in these documents, the aminosilane is mixed with the PAI resin precursor that is already in aqueous solution, i.e. it already incorporates an amine for salt formation and, given the choice of PAI resin in both examples, a solvent, this solvent being necessary for mixture in liquid form.

These patent documents are not free from either the presence of a volatile amine able to cause yellowing or the presence of a potentially toxic polar aprotic solvent.

Finally, and quite conventionally, the formulation of primer compositions requires in practice the introduction of colloidal silica to reinforce the obtained primer film. The quantities used range from 10 to 20% by weight (expressed in reference to the dry film). The addition of smaller quantities does not yield a sufficient reinforcement and it is difficult in practice to add greater quantities. But even at these levels, an aggregation of the silica particles, can be observed, causing the formation of nanoporosities in the primer film that are detrimental to the impermeability of the film and lead to the apparition of a prohibitive number of corrosion points.

To address these disadvantages and to obtain non-stick coatings that demonstrate thermal stability and reinforced mechanical resistance all while maintaining elasticity, good corrosion resistance and while significantly reducing coloring or yellowing, the applicant has developed non-stick coating primer compositions based on polyimide resin and/or polyamide-imide resin, obtained through a reaction between the polyimide resin and/or polyamide-imide resin and a coupling agent and an alkoxysilane and/or a metallic alkoxylate, the coupling agent enabling the PI and/or PAI resin to bind with the alkoxysilane and/or metallic alkoxylate. Such a reaction leads to a subsequent crosslinking via a sol-gel type reaction and an organic-inorganic hybrid structure is produced with formation in-situ of a network of nanoscale silica domains perfectly dispersed in the PI and/or PAI resin matrix.

The resulting organic-inorganic hybrid structure materials are nanocomposites designed to be a synergistic combination of:
  an organic phase: the binder resin PAI and/or PI plays the role of an organic polymer matrix. It provides flexibility via its amide functions and high thermostability via its imide rings to the obtained coating. On the other hand, the ductility of such a polymer matrix facilitates its implementation, particularly when substrates (such as disks) must subsequently be stamped; and
  an inorganic phase: a silica filler having penetrated into the polymer matrix to reinforce the mechanical resistance (hardness, rigidity), thermal resistance and corrosion resistance of the obtained coating. This filler is in reality a network of inorganic nanoscale domains (being said as "nanoformed") generated in-situ in the polymer matrix via the sol gel reaction using an inorganic metal oxide precursor.

The present invention thus relates to associate a binder resin of PAI and/or PI (organic phase) to a newly-formed inorganic phase by means of a coupling agent covalently bonded to the organic phases and inorganic phases. Such coupling agents are capable of opening and bonding with the imide rings of the PAI resin and/or PI resin and of generating silica in the chosen conditions of implementation.

Polyamide-imide resin/silica hybrid materials are known to persons of ordinary skill in the art.

Finally, an aminosilane is added to the sol-hybrid solution and the mixture is agitated. The method according to KR20090111951 describes a method of grafting the existing silica to the PAI resin using a coupling agent. But it does not describe a sol-gel method that generates silica in-situ that would make it possible to obtain nanoscale silica domains well dispersed throughout the polymer matrix.

Furthermore, patent document US2005/0245715 describes a method of producing a composite film of polymer resin and silica from carboxysilanes and a polymer resin, which relies on an amine-based coupling agent or a halogenated epoxy group. Nevertheless, the polymer resin used according to the method in this document is a polyamide-amic acid (PAA), which is a precursor of PAI resin and not a PAI resin itself. The composite films described in this document are used primarily in the domain of electronic and microelectronic devices and photovoltaic elements.

SUMMARY OF THE INVENTION

The object of the present invention is thus a non-stick coating primer composition that will resolve the above deficiencies. In particular, it pertains to a non-stick coating primer composition comprising:
- a polyimide resin and/or a polyamide-imide resin,
- an alkoxysilane and/or metallic alkoxylate,
- a coupling agent able to link the polyimide resin and/or the polyamide-imide resin with the alkoxysilane and/or the metallic alkoxylate, and
- a polar aprotic solvent.

The term coupling agent able to link the polyimide resin and/or polyamide-imide resin and the alkoxysilane and/or metallic alkoxylate, according to the present invention, means a compound having, on the one hand, one or more functional groups capable of binding to the PI and/or PAI resin, and in particular to the imide rings of the PI resin and/or PAI resin, and, on the other hand, one or more functional groups suitable to react with the alkoxysilane and/or the metallic alkoxylate to form, in-situ, silica.

Preferably, the primer composition according to the invention comprises a polyamide-imide resin.

Advantageously, the polyimide resin and/or polyamide-imide resin may constitute 20 to 70% by weight of the primer composition according to the invention, and preferably between 20 to 60% by weight, with respect to the total weight of said primer composition.

Advantageously, the alkoxysilane in the primer composition according to the invention may be chosen among methyltrimethoxysilane (MTMS), tetramethoxysilane (TMOS), tetraethoxysilane (TEOS), tetrapropoxysilane, methyltriethoxysilane (MTES), dimethyldimethoxysilane, phenyltriethoxysilane and mixtures thereof.

For the alkoxysilane, in the primer composition according to the invention, tetraethoxysilane (TEOS) is preferably used.

Advantageously, the metallic alkoxylate of the primer composition according to the invention may be chosen among aluminates, titanates, cerium oxides and zirconium oxides.

Advantageously, the alkoxysilane and/or metallic alkoxylate of the primer composition according to the invention may be hydrolyzed in either an acidic or a basic media. Preferably, the alkoxysilane and/or metallic alkoxylate is hydrolyzed in a basic media. In an acidic media, the hydrolysis reaction occurs rapidly before the condensation reaction leading to the gelation of the mixture; in a basic media, on the contrary, the condensation reaction happens much faster than the hydrolysis, making it possible to obtain colloidal solutions.

Advantageously, the primer composition according to the invention may also further contain an alcohol.

Among the alcohols that may be used in the primer composition according to the invention, notable examples include terpineol, propan-2-ol, methanol, (2-(2-Butoxyethoxy)ethanol), isopropanol, glycols (for example butylglycol, ethylene glycol monobutyl ether (EGBE), texanol (chemical name: 2,2,4-Trimethyl-1,3-pentanediol monoisobutyrate), diethylene glycol monomethyl ether, methoxypropanol and mixtures thereof.

Advantageously, the relative total amount by dry weight of the coupling agent relative to the polyimide resin and/or polyamide-imide resin may be comprised between 2 and 20% in the primer composition according to the invention.

Among the coupling agents that may be used in the primer composition according to the invention, notable examples include silazanes (and preferably hexamethyldisilazane), silane derivatives, and mixtures thereof.

Among the silane derivatives that may be used in the primer composition according to the invention, notable examples include aminosilanes, such as 3-aminomethyltrimethoxysilane (APrTMOS or APTMOS), 3-aminopropyltriethoxysilane (APTES or APrTEOS), 3-am inopropyltri (methoxyethoxy-ethoxy)silane, (4-aminobutyl) triethoxysilane, (3-aminophenyl)trimethoxysilane (APTMOS), m-aminophenyltrimethoxysilane, p-aminophenyltrimethoxysilane, 3-aminopropyl triethoxysilane (APTEOS), 11-aminoundecyltriethoxysilane, aminopropyl-silanetriol, bis(methyldiethoxysilylpropylamine), bis (triethoxysilylpropyl)amine, bis(trimethoxysilylpropyl) amine, bis[3-(trimethoxysilyl)propyl]ethylenediamine, and mixtures thereof. Preferably, the coupling agent of the primer composition according to the invention is 3-aminopropyltriethoxysilane (APTES).

Among the silane derivatives that may be used in the primer composition according to the invention, notable examples include epoxysilanes (preferably glycidyloxypropyl trimethoxysilane (GPTMS)), γ-glycidoxypropyltriethoxysilane, γ-glycidoxypropyl-trimethoxysilane (GTMOS), γ-glycidoxypropyl triethoxysilane (GTEOS), vinyltriethoxysilane, methacryloxyethyl triethoxysilane, methacryloxypropyltrimethoxysilane, methyltriethoxysilane, dimethyldiethoxysilane, isocyanate silanes of the formula OCN—$R^1$—$Si(R^2)_3$ in which $R^1$ is a $C_1$-$C_6$ alkene group (such as methylene, ethylene, propylene, butylene, pentylidene and hexamethylene) or a $C_1$-$C_6$ arylen group (such as phenylene or naphthalene) and $R^2$ is identical to $R^1$ or is different than $R^1$ and is thus a $C_1$-$C_6$ alkoxy group, and mixtures thereof.

Among the coupling agents that may be used according to the present invention, notable examples also include amino acids, such as a tyrosine, of the formula

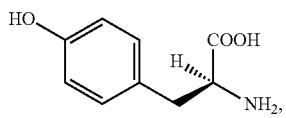

or a glycine, of the formula

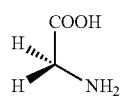

Advantageously, the polar aprotic solvent is present in the primer composition according to the invention at a concentration of 1 to 70% by weight relative to the total weight of the primer composition.

Advantageously, the polar aprotic solvent may comprise one or more of the following: N-formylmorpholine (NFM), N-ethylmorpholine, dimethyl sulfoxide (DMSO), N-acetylmorpholine (NAM), N-ethyl pyrrolidone (NEP), N-Butylpyrrolidone (NBP), N-Methylpyrrolidone (NMP), 1,3-dioxolane, 2,5,7,10-tetraoxaundecane, N-Methylpyrrolidine ketone, N,N-Dimethylformylamide, and N,N-Dimethylacetamide.

Advantageously, the primer composition according to the invention may be free of any thermostable bonding agents, and in particular fluorocarbon resin.

Advantageously, the primer composition according to the invention may also further comprise at least one filler or at least one pigment.

The primer composition according to the invention as defined above makes it possible to obtain a hybrid primer composition. This hybrid primer composition is an intermediary product obtained after mixing the various components and in which is formed a matrix of resin and of nanoscale silica domains dispersed within said resin.

Thus the object of the present invention is also a non-stick coating hybrid primer composition comprising a matrix of polyimide resin and/or polyamide-imide resin in which silica domains having a size less than 200 nm are dispersed in a polar aprotic solvent, where the size of the silica domains are measured either in wet state using laser particle size analysis in the hybrid primer composition according to the invention, or using transmission electron microscopy (TEM analysis) of the cooked primer film obtained from the hybrid primer composition according to the invention.

The polyimide resin and/or polyamide-imide resin matrix in which the silica domains are dispersed may advantageously be in colloidal dispersion in the polar aprotic solvent.

Advantageously, the silica domains in the hybrid primer composition according to the invention may present a size less than 100 nm, and preferably comprised between 10 and 50 nm.

Advantageously, the relative dry weight amount of the silica domains relative to the matrix of polyimide resin and/or polyamide-imide resin may be comprised between 10 and 25%, and preferably between 10 and 20%, in said hybrid primer composition.

Advantageously, the polar aprotic solvent may be present in the hybrid primer composition according to the invention at a concentration of 1 to 70% by weight relative to the total weight of the hybrid primer composition.

Advantageously, the polar aprotic solvent may comprise one or more of the following: N-formylmorpholine (NFM), N-ethylmorpholine, dimethyl sulfoxide (DMSO), N-acetylmorpholine (NAM), N-ethyl pyrrolidone (NEP), N-Butylpyrrolidone (NBP), and N-Methylpyrrolidone (NMP), 1,3-dioxolane, 2,5,7,10-tetraoxaundecane, N-Methylpyrrolidine ketone, N,N-Dimethylformamide, and N,N-Dimethylacetamide.

Advantageously, the hybrid primer composition according to the invention may be free of any thermostable bonding agent, and in particular fluorocarbon resin.

Advantageously, the hybrid primer composition according to the invention may further also comprise at least one filler or at least one pigment.

In the context of the present invention, as a filler in the primer composition according to the invention or in the hybrid primer composition according to the invention, preference is given to the use of nanoparticles of silica, alumina, talc, kaolin, barite, wollastonite, a silicon carbide, a clay, a lamellar sheet calcium silicate, a lamellar silicate hydrate, a phyllosilicate, calcium silicate hydrate, calcium organosilane, and mixtures thereof.

According to the present invention, as a pigment in the primer composition according to the invention or in the hybrid primer composition according to the invention, preference is given to the use of cobalt aluminate ($CoAl_2O_4$), chrome titanate, antimony, iron oxides, nickel titanate, carbon black, aluminosilicates, titanium dioxide, inorganic pigments of cubic crystal structure based on various metal oxides, iron oxide- or titanium oxide-coated mica flakes, iron oxide-coated aluminum flakes, perylene red, thermochromic semiconductor pigments (for example, metal oxide semiconductors such as $Fe_2O_3$, $Bi_2O_3$, or $BiVO_4$, etc.) and mixtures thereof.

The object of the present invention is also a non-stick coating comprising at least one layer of a non-stick coating hybrid primer composition according to the invention.

The one or more layers of the hybrid primer composition according to the invention are typically applied directly to a substrate, in particular onto the substrate of a culinary item, the substrate having optionally been previously subjected to a surface treatment.

On top of the one or more primer layers, an initial finishing layer is typically applied, itself preferably covered by at least a second finishing layer.

The one or more finishing layers comprise at least one thermostable bonding agent that is compatible with the one or more layers of the hybrid primer composition.

Among the thermostable bonding agents that may be used in the finishing layer(s) according to the invention, notable examples include enamels, fluorocarbon resins (alone or in combination), inorganic polymers or organic-inorganic hybrids synthesized using the sol-gel method.

The object of the present invention is also a method of preparing a non-stick coating primer composition according to the invention or a non-stick coating hybrid primer composition according to the invention, the method comprising the following steps:

a) introduction of the coupling agent into a solution comprising the polyimide resin and/or the polyamide-imide resin and the polar aprotic solvent; and b) addition, in a basic media, of alkoxysilane and/or the metallic alkoxylate, and water to the mixture resulting from step a).

In the case of the preparation of a non-stick coating hybrid primer composition according to the invention, the object of the present invention is also a method comprising the following steps:

a) introduction of the coupling agent into a solution comprising the polyimide resin and/or the polyamide-imide resin and the polar aprotic solvent; and b) addition of alkoxysilane and/or the prehydrolyzed metallic alkoxylate to the mixture resulting from step a).

In this specific case, the method according to the invention may advantageously further comprise a step c) the hydrolysis of the alkoxysilane and/or the metallic alkoxylate to produce prehydrolyzed alkoxysilane and/or metallic alkoxylate, this hydrolysis step c) being performed prior to step b) and comprising:

the hydrolysis, in a basic media, of the alkoxysilane and/or the metallic alkoxylate in a mixture of water and alcohol, or the hydrolysis, in a basic media, of the alkoxysilane and/or the metallic alkoxylate in a mixture of water and polar aprotic solvent.

The PI and/or PAI resin, the coupling agent, the polar aprotic solvent, the alkoxysilane and metallic alkoxylate are as specified above.

Whether used for the preparation of a non-stick coating primer composition according to the invention or for a non-stick coating hybrid primer composition according to the invention, the methods according to the invention may advantageously further comprise a step d) for the addition of fillers and/or pigments into the mixture obtained in step b).

The fillers and/or pigments are as specified above.

Similarly, whether used for the preparation of a non-stick primer coating composition according to the invention or for a non-stick coating hybrid primer coating composition according to the invention, the methods according to the invention may advantageously further comprise a step e) for the dissolution of the polyimide resin and/or the polyamide-imide resin in the polar aprotic solvent, this step e) being performed prior to step a).

Another object of the present invention is also a method of manufacturing an item comprising a non-stick coating according to the invention, the method comprising the following steps:

A) the provision of a substrate having two opposite surfaces;

B) the application onto at least one of the surfaces of said substrate of:
  at least one layer of the non-stick coating hybrid primer composition according to the invention, or
  at least one layer of the non-stick coating hybrid primer composition obtained according to the methods defined according to the invention for the preparation of a non-stick coating primer composition or of a non-stick coating hybrid primer composition;

C) the sintering of the ensemble at a temperature between 390° C. and 430° C.

Advantageously, the method of manufacturing an item according to the invention may furthermore comprise a step B') where at least one finishing layer of the non-stick coating is applied to the layer obtained in step B), prior to the sintering step C). Advantageously, the application step B') may be carried out on the layer obtained in step B) in wet state. When the layer obtained in step B) is dried prior to step B'), it may become hydrophobic and prevent the adhesion of the finishing layer subsequently applied.

The non-stick coating finishing layer is as specified above.

Finally, another object of the present invention is an item that may be obtained according to the method of manufacturing an item according to the invention.

Various types of items may be considered, of various forms and made of various materials, consistent with the invention.

Thus, it may be an item comprising a substrate made of material selected from various metals, glass, ceramics or plastics.

Among the metal substrates that may be used according to the present invention, advantageous examples would include substrates made of aluminum or an anodized or non-anodized aluminum alloy, or aluminum that has been polished, brushed, bead blasted or sanded, chemically treated or made of polished, brushed or bead blasted stainless steel, or cast iron or aluminum, titanium or hammered or polished copper.

The item according to the invention may, in particular, be a culinary item, and more particularly a culinary item, one surface of which comprises an interior surface intended to come into contact with foods placed inside said item and the other surface being an external convex surface intended to come into contact with a heat source.

Among the non-limiting examples of culinary items falling under the scope of the present invention, notable examples include culinary items such as pots and pans, woks, sauté pans, braising dishes, chef pans, pressure cookers, crepe makers, grills, baking molds and sheets, raclette dishes, barbecue planks and grills, mixing bowls, fryer tanks and rice cookers.

Other types of substrates, not limited to the culinary domain, may also be considered. Thus, one may also envision, within the scope of items according to the invention, household electrical appliances such as irons, curling irons, hair straighteners, etc., insulated containers (for coffeemakers, for example), or mixing bowls.

DETAILED DESCRIPTION OF THE INVENTION

Figure 1:
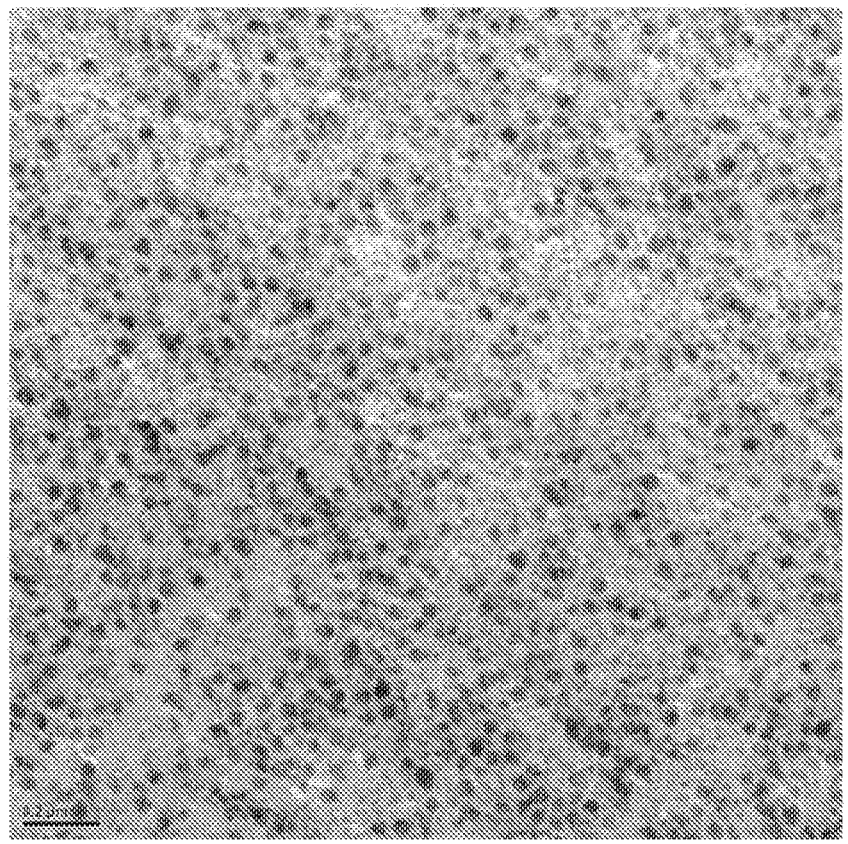
FIG. 1 is a TEM image of a cross section of the formed coating showing a homogenous distribution of nanoscale silica particles in the resin matrix.

The invention is illustrated in greater detail in the following examples.

In these examples, except where indicated, all percentages and proportions are expressed in percentages by weight.

EXAMPLES

Tests
Determination of Dry Extract in a Composition
Principle

The dry extract of a composition is the solid residual portion that remains after the volatile matter which it contains has been evaporated. The temperature and duration of drying play an important role, as high boiling point solvents, fractions of monomers, reactive diluents and by-products of the reaction (depending on the degree of their retention), are slow to leave the film into formation. It is consequently very important to formally define the standardized drying conditions, in a manner that is as close to the practice as possible.

Technique

The procedure used to measure this dry extract is as follows:
- an aluminum measuring cup is weighed: $m_0$=mass of the cup;
- 0.5 g-3 g of the composition to be studied is placed into the cup;
- the filled cup is weighed: $m_1$=mass of the filled cup;
- the filled cup is placed in a drying oven at a temperature of 210° C. for two hours;
- after drying and after cooling, the cup is weighted again: $m_2$=mass of the filled cup after drying and cooling;
- the dry extract is calculated with the following formula:

Dry extract=$100*[(m_2-m_0)/(m_1-m_0)]$

Measurement of Particle Size and Size Distribution Using Light Diffraction

The grain size of the colloidal solution obtained by hydrolyzing the TEOS (see Example 1 below) can be characterized using a laser diffraction particle size analyzer marketed by the Malvern company under the commercial name Nanosizer, which measures the Brownian motion of particles in suspension in relation to the size of the colloids (a small particle moves faster than Larger Particles) Via the Diffraction of Light.

Assessment of the adhesion of a coating on a smooth aluminum substrate

A cross-hatch adhesion test is carried out in accordance with the standard NF T 30-038 (standard NF EN ISO 2409), followed by the immersion of the coated substrate for 18 hours (consisting of three 3-hour cycles in boiling water and three 3-hour cycles in oil heated to 200° C.). Then, the non-stick coating is examined for evidence of disbanding or not. The rating is determined according to the criteria in the table below.

| Rating | Description |
|---|---|
| 0 | The edges of the cuts are perfectly smooth: none of the squares in the grid are detached. |
| 1 | Detachment of small flakes of the coating at the intersections of the cuts, affecting an area of approximately 5% of the cross-hatched area. |
| 2 | The coating has flaked along the edges or at the intersections of the cuts, with the affected area representing significantly more than 5% and up to around 15% of the cross-hatched area. |
| 3 | The coating has flaked along the edges of the cuts partly or wholly in large ribbons or has detached partly or wholly in various places within the cross-hatched area. The detached surface represents significantly more than 15% and up to around 35% of the cross-hatched area. |
| 4 | The coating has flaked along the edges of the cuts in large ribbons or some squares have detached partly or wholly. The detached surface represents significantly more than 35% and up to around 65% of the cross-hatched area. |
| 5 | Any degree of flaking that cannot be classified by Rating 4. |

Assessment of Yellowing

Yellowing after sintering of coated substrates is evaluated by visual comparison.

Morphological Analysis

The morphological analysis of silica filler within a polymer resin matrix is carried out using TEM analysis.

TEM analysis is an efficient method used to visualize the morphology of silica charges within a polymer matrix, such as a PAI resin, whether the fillers were pre-formed (Ludox-type colloidals) or obtained in-situ using a sol-gel method.

Example 1

In a first step, a basic solution of hydrolyzed TEOS is prepared by mixing, under magnetic agitation and at controlled room temperature, the following components:

| | |
|---|---|
| Pure TEOS | 262.28 g |
| NEP | 142.43 g |
| a mixture of water and a base: | |
| water | 52.21 g |
| ammonia solution at 10.25% by weight in water: | 42.85 g |
| TOTAL | 499.77 g |

This solution is maintained under slow agitation for two hours at room temperature. The resulting solution is opalescent, stable for several months, and has the following characteristics:

Characteristics:
- pH: 9.6
- viscosity: 280 mPas
- percentage of TEOS: 52.5%/total mass of wet solution
- appearance: translucent, iridescent
- particle size analyzed using laser diffraction particle size analysis: 20 to 40 nm
- pot life: more than several months In a second step, a solvent-based PAI resin is introduced at 29% by weight into the NEP, in a reactor. After dilution of the PAI resin in the NEP, the APTES is added the neutralization reaction of the terminal acid groups by the aminosilane leads to the chemical grafting of the silane. The reaction occurs at room temperature under slow agitation for two hours.

Finally the hydrolyzed TEOS solution is added according to the directions provided in the 1st step and the mixture is left under slow agitation at room temperature for 20 to 24 hours.

The proportions of the mixture are indicated below:

| | |
|---|---|
| PAI resin at 29% by weight in the NEP | 218.35 g |
| NEP | 98.31 g |
| APTES | 5.40 g |
| basic solution of hydrolyzed TEOS | 177.94 g |
| TOTAL | 500.00 g |

The mass ratio (expressed as dry mass/dry mass) of PAI resin/SiO$_2$ is 77/23.

The resulting colloidal solution of the PAI resin/silica hybrid material in the NEP thus obtained has a dry extract of 16.5%, a pH of 10.2 and a viscosity (measured in accordance with the standard DIN EN ISO 2433/ASTM 05125 in a DIN 4 flow cup) of 80 seconds. This solution is stable for up to three weeks stored at room temperature.

According to a first embodiment (application onto a pre-formed substrate), this hybrid material colloidal solution is used as such, and applied in a thin layer by spraying onto an aluminum substrate in the shape of a cap (preformed substrate) previously subjected to a surface treatment.

The performance characteristics obtained are as follows:
The thin layer achieved above, analyzed using TEM, demonstrates that a hybrid organic/inorganic material with none clustered nanoscale silica domains has been obtained (co-continuous networks of silica and PAI resin). The TEM analysis reveals individual silica particles less than 100 nm in diameter with no agglomeration or aggregation.

The silica filler is present across the entire thickness of the film, as depicted in FIG. 1, which is a TEM image of a cross section of the formed coating demonstrating a homogenous distribution of the nanoscale silica particles in the PAI resin matrix and their dimensions: the mean diameter of the silica particles is approximately 37±4 nm.

The presence of a co-continuous network of silica is demonstrated using calcination. A film is obtained for which the chemical analysis using infrared spectroscopy reveals two bands featuring silica at $\sigma=1075$ cm$^{-1}$ and $\sigma=804$ cm$^{-1}$ (condensation of Si—O—Si siloxane bridges)

The implementation of this hybrid primer layer in a three-layer coating system (hybrid organic/inorganic primer layer+first PTFE-based finishing layer without PAI resin applied wet on wet+second PTFE-based finishing layer) sintered under standard conditions (11 minutes at 430° C.) results in a ranking of 0 in three cycles of adhesion testing.

The resulting hybrid coating is non-yellowing (−35% yellowing compared to a standard PTFE-based primer system such as the system described in Comparative Example 1).

A corrosion resistance test of the hybrid coating, conducted by exposing the coating to a boiling, 10% salt water solution for 24 hours, yielded no points of corrosion.

Furthermore, according to a second embodiment (application onto a substrate with post-forming of the substrate), the hybrid primer composition obtained in Step 2 is applied to an aluminum disc that had been previously subjected to a chemical stripping process, dried and then heated. A first, PTFE-based finishing layer without PAI resin is then applied wet on wet to this primer layer, then a second PTFE-based finishing layer is applied to the first finishing layer. The whole is then sintered under standard conditions (11 minutes at 430° C.). The resulting coated substrate is then stamped to form a cap that is coated on its interior surface.

This post-formed coated cap demonstrates similar performance features as the preformed coated cap described above, illustrating the suitability of the hybrid coating for stamping.

Example 2

A solvent-based PAI resin is introduced at 29% by weight into the NEP in a reactor. It is diluted with the NEP, then the APTES is added. The neutralization reactions of the terminal acid groups by the aminosilane leads to the chemical grafting of the silane. The reaction occurs at room temperature under slow agitation for two hours.

Next the TEOS is added with demineralized water and a base, then the mixture is left under slow agitation at room temperature for 20 to 24 hours. The proportions of the various components are as follows:

| | |
|---|---|
| PAI resin at 29% by weight in the NEP | 218.35 g |
| NEP | 149.20 g |
| APTES | 5.40 g |
| Pure TEOS | 93.38 g |
| demineralized water | 18.41 g |
| ammonia solution at 10.25% by weight in water | 15.26 g |
| TOTAL | 500 g |

The mass ratio (expressed as dry mass/dry mass) of PAI resin/SiO$_2$ is 77/23.

The resulting colloidal solution of the PAI resin/silica hybrid material in the NEP has a dry extract of 16.5%, a pH of 10.2 and a viscosity (measured in accordance with the standard DIN EN ISO 2433/ASTM 05125) of 65 seconds. This solution is stable for up to three weeks stored at room temperature.

This solution is used as is and applied in a thin layer by spraying onto an aluminum substrate in the shape of a cap (preformed substrate) previously subjected to a surface treatment.

The performance characteristics obtained are as follows:
The implementation of this hybrid primer layer in a three-layer coating system (hybrid organic/inorganic primer layer+first PTFE-based finishing layer without PAI resin applied wet on wet+second PTFE-based finishing layer) sintered under standard conditions (11 minutes at 430° C.) results in a ranking of 0 in three cycles of adhesion testing.

The resulting hybrid coating is non-yellowing (−30% yellowing compared to a standard PTFE-based primer system such as the system described in Comparative Example 1).

A corrosion resistance test of the hybrid coating, conducted by exposing the coating to a boiling, 10% salt water solution for 24 hours, yielded no points of corrosion.

Comparative Example 1

A semi-finished aqueous composition is prepared comprising the following components, the respective quantities of which are detailed in figure g below:

| | |
|---|---|
| PAI resin at 29% by weight in the NEP | 220.0 g |
| NEP | 79.0 g |
| triethylamine | 22.0 g |
| demineralized water | 350.0 g |
| colloidal silica | 63.5 g |
| TOTAL | 734.5 g |

The colloidal silica used has no modified surface, a specific surface of approximately 220 m$^2$/g, and has the form of an aqueous dispersion of nanoparticles with a dry extract of 30% by weight in water.

The procedure to prepare the semi-finished aqueous mixture is as follows:

the PAI resin is placed into a Discontimill reactor with the solvent and the triethylamine;

the resulting mixture is then ground into the Discontimill reactor at room temperature; then water is added gradually to achieve the aqueous phase and obtain a dispersed polyamide-amic acid;

grinding is continued for two hours to obtain an intermediate mixture.

The properties of the semi-finished mixture thus obtained are as follows:

theoretical dry extract: 9.5%
measured dry extract: 9.0%
the product is honey-colored, translucent and viscous
viscosity (in accordance with the standard DIN EN ISO 2433/ASTM 05125): 140 sec The dispersion of colloidal silica of 40 to 200 nm in size is introduced the intermediate mixture, at room temperature, to obtain the semi-finished aqueous mixture.

The properties of the semi-finished aqueous mixture thus obtained are as follows:

theoretical dry extract: 11.3%,
measured dry extract in the solution: 11.0%,
the product is honey-colored, translucent and viscous
viscosity (in accordance with the standard DIN EN ISO 2433/ASTM 05125): 150 seconds,
the proportion of silica is 23% by weight with respect to the polyamide-amic acid.

Then, from the aqueous semi-finished mixture, an aqueous binder primer composition is prepared with the following components:

| | |
|---|---|
| dispersion of PTFE at 60% by weight in water | 30.5 g |
| dispersion of carbon black at 25% by weight in water | 3.5 g |
| the above partially finished aqueous mixture | 50.0 g |
| non-ionic tensoactive system at 12.5% dry extract | 5.1 g |
| $NH_4OH$ | 1.4 g |
| demineralized water | 9.5 g |
| Total | 100.0 g |

This aqueous binder primer composition presents the following characteristics:

the fluorine-containing resin content in the dry primer composition is approximately 71.9% by weight relative to the total dry weight of the composition,
the polyamide-amic acid content of the dry primer composition is approximately 17.1% by weight relative to the total dry weight of the composition,
the silica content of the composition is 23/77 by weight relative to the dry weight of the polyamide-amic acid,
the theoretical dry extract is 25.5%, and
the viscosity (measured in accordance with the standard DIN EN ISO 2433/ASTM 05125) is 65 seconds.

This aqueous binder primer composition is applied in a thin layer by spraying onto an aluminum substrate in the shape of a cap (preformed substrate) previously subjected to a surface treatment.

The performance characteristics obtained are as follows:

The implementation of this thin binder primer layer in a three-layer coating system (primer layer as described above+first PTFE-based finishing layer without PAI resin applied dry on dry+second PTFE-based finishing layer) sintered under standard conditions (11 minutes at 430° C.) results in rankings of 3 or 4 in three cycles of adhesion testing.

A corrosion resistance test of the obtained coating, conducted by exposing the coating to a boiling, 10% salt water solution for 24 hours, yielded 5 points of corrosion. This result is inconsistent.

Figure 2:
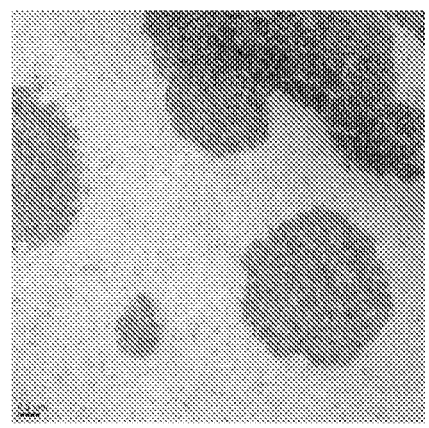
FIG. 2 is a TEM image of the binder primer layer.

The binder primer layer comprising a dispersion of colloidal silica is analyzed using TEM. FIG. 2, which is a TEM image of a cross section of the resulting primer layer, reveals agglomeration of the filler across the entire thickness of the film, in a circular or oval shape, and of equivalent dimension across the thickness of the film (length of the agglomerations ranging from 0.5 μm to 3 μm).

The invention claimed is:

1. A non-stick coating primer composition comprising:
a polyimide resin and/or a polyamide-imide resin,
an alkoxysilane and/or metallic alkoxylate,
a coupling agent able to link the polyimide resin and/or the polyamide-imide resin with the alkoxysilane and/or the metallic alkoxylate, and
a polar aprotic solvent.

2. The composition according to claim 1, wherein the alkoxysilane is selected from the group consisting of methyltrimethoxysilane (MTMS), tetramethoxysilane (TMOS), tetraethoxy silane (TEOS), tetrapropoxy silane, methyltriethoxy silane (MTES), dimethyldimethoxysilane, phenyltriethoxysilane and mixtures thereof.

3. The composition according to claim 1, wherein the total relative dry weight content of the coupling agent relative to the polyimide resin and/or the polyamide-imide resin is between 2 and 20% of said primer composition.

4. The composition according to claim 1, wherein the coupling agent is selected from the group consisting of silazanes, silane derivatives and mixtures thereof.

5. The composition according to claim 1, wherein the polar aprotic solvent is present at a concentration of 1 to 70% by weight relative to the total weight of the composition.

6. The composition according to claim 1, wherein the non-stick coating primer composition is free of fluorocarbon resin.

* * * * *